3,064,043
OXIDATION OF ORGANIC COMPOUNDS
Arthur William Charles Taylor and Fred Dean, Norton-on-Tees, England, assignors to Imperial Chemical Industries Limited, London, England, a corporation of Great Britain
No Drawing. Filed Aug. 1, 1958, Ser. No. 752,419
Claims priority, application Great Britain Aug. 23, 1957
8 Claims. (Cl. 260—523)

This invention relates to the production of oxygenated organic compounds and in particular aromatic dicarboxylic acids.

It has been found difficult to oxidise para-xylene to terephthalic acid by means of molecular oxygen using conventional catalysts such as manganese and cobalt acetates because one of the methyl groups is attacked and this seriously deactivates the molecule, rendering the other methyl group highly resistant to further oxidation.

According to the prior art this difficulty has been met to some extent by oxidising para-xylene to toluic acid, esterifying this with methanol, oxidising the resulting methyl para-toluate to methyl para-hydrogen terephthalate using as catalyst, e.g. manganese and cobalt acetates or naphthenates and hydrolysing or esterifying the last mentioned compound to terephthalic acid or dimethyl terephthalate. This process has the disadvantages that it employs a large number of stages involving high capital expenditure and that the overall conversions to desired product are rather low.

According to the present invention there is provided a process for the production of terephthalic acid which comprises oxidising para-toluic acid or para-formyl toluene in the presence of ortho-phthalic anhydride in the liquid phase by means of molecular oxygen or ozone in the presence of an oxidation catalyst and in the substantial absence of halogen while continuously removing water of reaction as vapour.

The ortho-phthalic anhydride may be introduced as such or may be formed in situ from ortho-phthalic acid.

Air oxidation of organic compounds has already been described in which catalysts comprising a metal of variable valence and halogen, e.g. bromine, are used. Unlike that process the present one is conducted in the substantial absence of halogen, and gives high yields and conversions for a process not using halogen.

Suitable oxidation catalysts comprise for example lead, vanadium, cerium, nickel, manganese and cobalt, which can be employed as their inorganic or organic salts, such as the acetate and naphthenates. Manganese and cobalt severally or in admixture are especially effective.

The oxygen may be introduced as such, or as air or diluted air, or if desired ozonated air may be used.

It is a considerable advantage to operate in the absence of halogen because the corrosive effect of the reaction mixture on metal is considerably decreased. Hence on the one hand the plant has much longer life, and on the other the inhibiting effect of the corrosion products on the reaction is also decreased.

The present process is conducted under such conditions of reaction concentration, temperature, pressure and rate of water removal that substantially no ortho-phthalic acid is allowed to persist in the system. Under these conditions any orthophthalic acid formed is decomposed to ortho-phthalic anhydride which remains in the system as a reaction component, and terephthalic acid is formed as final reaction product and is filtered off.

As a desirable feature the oxidation is conducted within a range of the aforesaid reaction conditions simultaneously favourable to anhydride exchange between para-toluic acid, present initially or formed in the reaction, and ortho-phthalic anhydride, and also to dehydration of ortho-phthalic acid to phthalic anhydride, which serves to maintain the desired concentration of this reaction in the reaction zone. Suitable conditions are, for example, a molar ratio of ortho-phthalic anhydride to para-toluic acid or para-tolualdehyde of from 1:5 to 6:1 and a temperature of from 180° to 300° C. preferably about 200° C. Below 180° C. the reaction rate is slow, above 300° C. there is increasing tendency for by-product formation. Atmospheric pressure is preferred, but if desired superatmospheric pressure, e.g. up to 10 atmospheres gauge may be used. The aforesaid ratio may be as high as 10:1 but this is wasteful of reaction volume.

Without committal the reaction mechanism may possibly be as follows. When the molar ratio of para-toluic acid to orthophthalic anhydride is greater than 1:1, two moles of para-toluic acid are envisaged as reacting with one mole of ortho-phthalic anhydride to give one mole of para-toluic anhydride and one mole of ortho-phthalic acid. Under the operating conditions used this ortho-phthalic acid dehydrates to ortho-phthalic anhydride which serves to maintain the desired concentration of this component in the reaction zone, while the para-toluic anhydride which is readily oxidisable under the reaction conditions is converted to terephthalic anhydride and the mixed anhydride of terephthalic and para-toluic acids, which are hydrolysed respectively by the water present in the system to terephthalic acid, and terephthalic and para-toluic acids.

When the molar ratio of para-toluic acid to ortho-phthalic anhydride is equal to or less than 1:1, 1 mole of para-toluic is envisaged as reacting with 1 mole of ortho-phthalic anhydride to give 1 mole of the mixed anhydride of para-toluic acid and ortho-phthalic acid. On oxidation this yields the mixed anhydride of terephthalic acid and ortho-phthalic acid, which on being hydrolysed by the water present in the system gives terephthalic acid and ortho-phthalic acid. The terephthalic acid so produced is filtered off from the hot mixture and is washed with a suitable washing liquid such as a light hydrocarbon or ether, and the para-toluic acid in the filtrate is available for oxidation.

Operation as described has the advantage that the process is single stage and thus economic in cost of equipment.

*Example 1*

40 grams of para-toluic acid in admixture with 200 grams of phthalic anhydride, 0.15 gram of cobalt acetate, $Co(OOCCH_3)_2.4H_2O$, and 0.3 gram of manganese acetate, $Mn(OOCCH_3)_2.4H_2O$ was subjected to oxidation in a glass reactor at about 200° C. at atmospheric pressure with molecular oxygen fed at a rate of 12 litres per hour through the hollow shaft of a rapidly rotating cruciform stirrer with which the reaction was provided. Oxygen was steadily absorbed and the water of reaction was removed through a distillation column fitted with a Dean and Stark decanter in the exit gas line.

The process was stopped after 22 hours, and on filtering the hot reaction product crude terephthalic acid was obtained, which on extraction with petroleum ether yielded 16.1 grams of terephthalic acid (100% purity by acid value). This corresponds to a molar conversion to desired product of 33%.

On repetition of the above process using benzoic acid instead of phthalic anhydride as solvent, no absorption of oxygen occurred and no terephthalic acid was produced. This run shows that the reaction was not due to temperature effect alone, but to the presence of ortho-phthalic anhydride.

Example 2

The following illustrates continuous operation. To the filtrate from Example 1 was added 40 grams of para-toluic acid and as make-up catalyst 0.15 gram of the same cobalt salt and 0.30 gram of the same manganese salt and the process was repeated in similar manner. The reaction mixture became viscous and was difficult to stir.

On working up the reaction product as in Example 1, 7.9 gram of substantially pure terephthalic acid was obtained, representing a pass yield of 16% of theoretical.

The filtrate, together with the residue obtained from the washings after distilling off the petroleum ether, was oxidised four times successively without further addition of para-toluic acid. In this way a further 40.4 gram of substantially pure terephthalic acid was obtained, so that in all 64.4 gram of terephthalic acid was produced. This represents a pass yield of 66% theoretical based on the para-toluic acid charged (80 gram).

Example 3

200 grams of para-toluic acid in admixture with 50 grams of phthalic anhydride, 0.15 gram of cobalt acetate, $Co(OOCCH_3)_2 \cdot 4H_2O$, and 0.30 gram of manganese acetate, $Mn(OOCCH_3)_2 \cdot 4H_2O$ was subjected in a stirred glass reactor at about 200° C. to oxidation in the liquid phase with molecular oxygen fed at a rate of 12 litres per hour through the hollow shaft of a rapidly rotating cruciform stirrer. The other details were as in Example 1.

The process was stopped after 22 hours. On working up the product by the method described in Example 1 there was obtained 53.6 gram of substantially pure terephthalic acid, which represents a pass yield of 22% of the theoretical.

In this example the yield of terephthalic acid was 0.21 gram/gram of total charge compared wtih 0.067 gram/gram of total charge in Example 1.

We claim:

1. Process for the production of terephthalic acid, which comprises oxidizing an oxygen-containing derivative of toluene, selected from the group consisting of paratoluic acid and para-formyl toluene, in the presence of ortho-phthalic anhydride, which is in a molar ratio to the said oxygen-containing derivative of toluene between about 1:5 to 6:1, and in the further presence of an oxidation catalyst consisting essentially of a member selected from the group consisting of salts of lead, vanadium, cerium, nickel, manganese, and cobalt, and a mixture of organic salts of manganese and cobalt, and under halogen-free conditions, by passing an oxygen-containing gas through the reaction mixture maintained at a temperature between about 180° and 300° C. while continuously removing water of reaction as vapor.

2. Process as claimed in claim 1 in which the said ratio is in excess of 1:1.

3. Process as claimed in claim in which the temperature is about 200° C.

4. Process as claimed in claim 1 in which the ortho-phthalic anhydride is introduced as such.

5. Process as claimed in claim 1 in which ortho-phthalic acid is fed to the process and ortho-phthalic anhydride is produced in situ under the reaction conditions.

6. Process as claimed in claim 1 in which the catalyst consists essentially of a salt of cobalt.

7. Process as claimed in claim 1 in which the catalyst consists essentially of cobalt.

8. Process as claimed in claim 1 in which the catalyst consists essentially of a mixture of organic salts of cobalt and manganese.

References Cited in the file of this patent

UNITED STATES PATENTS

| | | |
|---|---|---|
| 2,727,919 | Saunders | Dec. 20, 1955 |
| 2,764,611 | Katzschmann | Sept. 25, 1956 |